US012046951B2

(12) United States Patent
Vollmer

(10) Patent No.: US 12,046,951 B2
(45) Date of Patent: Jul. 23, 2024

(54) METHOD FOR PRODUCING A MAGNETIC MATERIAL LAYER

(71) Applicant: SIEMENS AKTIENGESELLSCHAFT, Munich (DE)

(72) Inventor: Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 802 days.

(21) Appl. No.: 17/259,442

(22) PCT Filed: Jul. 10, 2019

(86) PCT No.: PCT/EP2019/068477
§ 371 (c)(1),
(2) Date: Jan. 11, 2021

(87) PCT Pub. No.: WO2020/011820
PCT Pub. Date: Jan. 16, 2020

(65) Prior Publication Data
US 2021/0126514 A1 Apr. 29, 2021

(30) Foreign Application Priority Data
Jul. 13, 2018 (EP) .................... 18183449

(51) Int. Cl.
H02K 1/24 (2006.01)
B22F 10/16 (2021.01)
(Continued)

(52) U.S. Cl.
CPC ............. H02K 1/246 (2013.01); B22F 10/16 (2021.01); B22F 10/60 (2021.01); B29C 64/165 (2017.08);
(Continued)

(58) Field of Classification Search
CPC ...... H02K 1/246; H02K 15/022; B33Y 10/00; B33Y 70/00; B33Y 80/00; B33Y 40/20;
(Continued)

(56) References Cited

U.S. PATENT DOCUMENTS 5,145,614 A * 9/1992 Kuroda .................... B29C 70/62
148/101
5,488,260 A * 1/1996 Heyraud ................ H02K 1/278
29/598

(Continued)

FOREIGN PATENT DOCUMENTS

CN 1463065 A 12/2003
CN 102468718 A 5/2012
(Continued)

OTHER PUBLICATIONS

PCT International Search Report and Written Opinion of International Searching Authority dated Oct. 30, 2019 corresponding to PCT International Application No. PCT/EP2019/068477 filed Jul. 10, 2019.

Primary Examiner — Jeffrey T Carley
(74) Attorney, Agent, or Firm — Henry M. Feiereisen LLC

(57) ABSTRACT

In a method for producing a material layer by an additive process, a first suspension with binding agent and solid particles is applied through a first template onto a base area to obtain a first green body, thereby reproducing by the first template a first material region of a first material to form a magnetic flux-conductive region with a first magnetic permeability $\mu r > 50$. A second suspension with binding agent and solid particles is applied through a second template onto a base area to obtain a second green body, thereby reproducing by the second template a second material region of a second material to form a flux-blocking region with a second magnetic permeability $\mu r < 5$. The first and second (Continued)

green bodies are joined and a permanent, material-bonded cohesion between the first and second green bodies and the solid particles is created by heating and/or by compaction.

14 Claims, 4 Drawing Sheets

(51) Int. Cl.
| | |
|---|---|
| *B22F 10/60* | (2021.01) |
| *B29C 64/165* | (2017.01) |
| *B29C 64/30* | (2017.01) |
| *B33Y 10/00* | (2015.01) |
| *B33Y 40/20* | (2020.01) |
| *B33Y 70/00* | (2020.01) |
| *B33Y 80/00* | (2015.01) |
| *H02K 15/02* | (2006.01) |
| *B29K 505/00* | (2006.01) |
| *B29L 31/00* | (2006.01) |

(52) U.S. Cl.
CPC .............. *B29C 64/30* (2017.08); *B33Y 10/00* (2014.12); *B33Y 40/20* (2020.01); *B33Y 70/00* (2014.12); *B33Y 80/00* (2014.12); *H02K 15/022* (2013.01); *B29K 2505/00* (2013.01); *B29K 2995/0008* (2013.01); *B29L 2031/7498* (2013.01)

(58) Field of Classification Search
CPC ....... B29C 64/30; B29C 64/165; B22F 10/60; B22F 10/16; B29K 2505/00; B29K 2995/0008; B29L 2031/7498
See application file for complete search history.

(56) References Cited

U.S. PATENT DOCUMENTS

| | | | | |
|---|---|---|---|---|
| 5,693,250 | A * | 12/1997 | El-Antably | ............ H02K 1/246 |
| | | | | 148/306 |
| 5,898,253 | A * | 4/1999 | El-Antably | ............ H02K 15/03 |
| | | | | 148/108 |
| 6,509,667 | B1 * | 1/2003 | El-Antably | ............ H02K 15/02 |
| | | | | 310/43 |
| 10,022,789 | B2 * | 7/2018 | Hosek | ....................... B22F 9/20 |
| 2003/0192169 | A1 * | 10/2003 | Reiter, Jr. | ............. H02K 15/03 |
| | | | | 29/608 |
| 2012/0086289 | A1 | 4/2012 | Kolehmainen | |
| 2015/0115749 | A1 | 4/2015 | Dial et al. | |
| 2016/0056674 | A1 | 2/2016 | Buettner et al. | |
| 2019/0305616 | A1 | 10/2019 | Bittner et al. | |

FOREIGN PATENT DOCUMENTS

| | | | | |
|---|---|---|---|---|
| CN | 102545422 | A | 7/2012 | |
| CN | 105122595 | A | 12/2015 | |
| EP | 1 300 207 | A2 | 4/2003 | |
| EP | 1 300 210 | A2 | 4/2003 | |
| EP | 1734637 | A1 * | 12/2006 | ............. H02K 1/276 |
| EP | 2768117 | A1 | 8/2014 | |
| EP | 2 775 591 | A1 | 9/2014 | |
| EP | 2 793 362 | A1 | 10/2014 | |
| EP | 3 255 758 | A1 | 12/2017 | |
| EP | 3255758 | A1 * | 12/2017 | ............. H02K 1/246 |
| JP | H08205493 | A | 8/1996 | |
| JP | H09117084 | A | 5/1997 | |
| JP | 2005020991 | A * | 1/2005 | ............. H02K 1/276 |
| JP | 2016184991 | A * | 10/2016 | |
| WO | WO-2013103118 | A1 * | 7/2013 | ........... H02K 1/2766 |
| WO | WO-2018043081 | A1 * | 3/2018 | ............... H02K 1/24 |

* cited by examiner

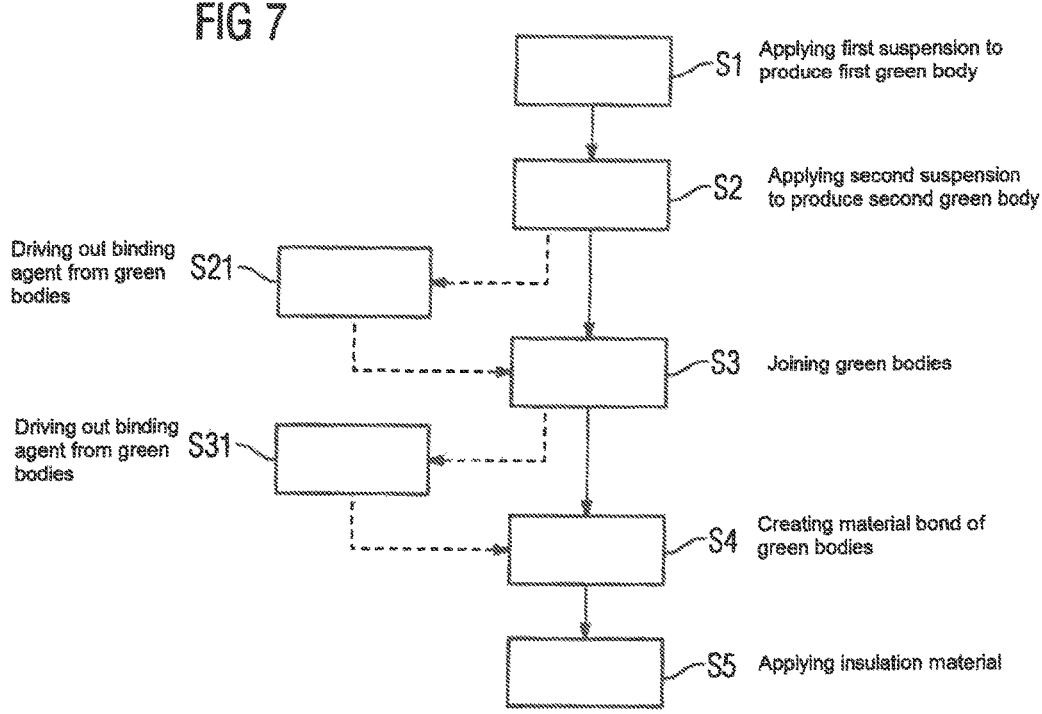
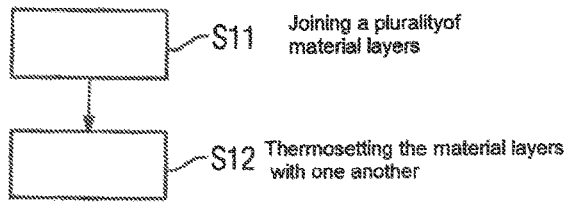
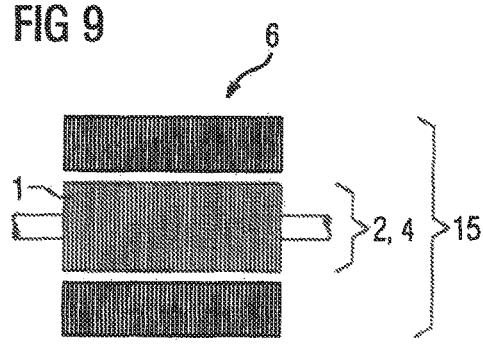

METHOD FOR PRODUCING A MAGNETIC MATERIAL LAYER

CROSS-REFERENCES TO RELATED APPLICATIONS

This application is the U.S. National Stage of International Application No. PCT/EP2019/068477, filed Jul. 10, 2019, which designated the United States and has been published as International Publication No. WO 2020/011820 A1 and which claims the priority of European Patent Application, Serial No. 18183449.0, filed Jul. 13, 2018, pursuant to 35 U.S.C. 119(a)-(d).

BACKGROUND OF THE INVENTION

The invention relates to a material layer for a dynamoelectric rotary machine, wherein the material layer comprises magnetic flux-conductive regions, having a first material with a first magnetic permeability $\mu r>50$, and at least one flux-blocking region, having a second material with a second magnetic permeability $\mu r<5$ which is lower compared to the first magnetic permeability.

A stator and a rotor form part of the magnetic circuit of a machine, which can be operated both as a motor and also as a generator. The rotor and the stator represent the power-generating components, also known as active parts, of the machine and have hitherto been manufactured as laminated cores.

The laminated cores comprise metal sheets which are cut out or stamped from large rolled metal sheets made from soft-magnetic material. The metal sheets are then packaged to form a laminated core.

A reluctance machine has a rotor with a flux barrier cut, which is used to shape a magnetic pole pair or a number of magnetic pole pairs. In accordance with the prior art the flux barriers are similarly cut out or stamped from the large metal sheets and are thus filled with air (or with another fluid which is present in the reluctance machine, in particular a gas).

With a conventional manufacture of metal sheets for reluctance machines, waste accumulates when the metal sheets are cut out or stamped from the large metal sheets or when the flux barriers are cut out or stamped.

Furthermore, rotors with metal sheets, which have a flux barrier cut, are very filigreed, prone to oscillations and generate noises. In particular, high rotational speeds cannot be reached as a result of the filigree structure.

EP 2775591 A1 further shows a rotor of a rotatory dynamoelectric reluctance machine (inverse reluctance machine), wherein viewed in the rotational direction the rotor has different magnetic resistances.

In this regard magnetic regions are held on amagnetic regions by means of a binding and/or an adhesive bond and/or a soldered bond and/or other connection elements. On the one had this is very laborious, however. On the other hand, the connection between the magnetic regions and the amagnetic regions is not stable and resistant.

The object underlying the invention is therefore to simplify the production of machines, in particular reluctance machines, in particular of inverse reluctance machines, and to improve the resistance capability.

SUMMARY OF THE INVENTION

The object is achieved by a material layer for a dynamoelectric rotary machine, wherein the material layer comprises magnetic flux-conductive regions, having a first material with a first magnetic permeability $\mu r>50$, and at least one flux-blocking region, having a second material with a second magnetic permeability $\mu r<5$ which is lower compared with the first magnetic permeability, wherein the first material and the second material are connected with a material bond.

Furthermore, the object is achieved by a method for producing a material layer of this type, as set forth hereinafter.

A method for producing a material layer structure and a material layer structure are also described.

Advantageously a rotor for a dynamoelectric rotary machine, in particular reluctance machine, has a material layer structure of this type.

A dynamoelectric rotary machine, in particular reluctance machine, advantageously has a rotor of this type.

The material layer is particularly well suited to a rotor of a dynamoelectric rotary machine, in particular reluctance machine.

The material layer preferably has a rotational direction about an axis of rotation arranged in a layer center point of the material layer.

The material layer advantageously has the previous functions of a metal sheet in a rotor laminated core of a conventional dynamoelectric rotary machine and realizes the tasks of a metal sheet.

A periphery of the material layer advantageously substantially corresponds to the periphery of a metal sheet of a conventional dynamoelectric rotary machine.

The material layer is advantageously produced to be thinner and/or can be produced to be thinner than a metal sheet.

The material layer structure advantageously has the previous functions of a rotor laminated core of a conventional dynamoelectric rotary machine and realizes the tasks of a rotor laminated core of a conventional dynamoelectric rotary machine.

The material layers are arranged one above the other in order to create the material layer structure. The material layers are preferably arranged in the direction of an axis of rotation, in other words along an axis of rotation, of the material layer structure.

Other arrangements, in which at least two material layers are adjacent, are also conceivable.

The material layer preferably has a substantially round, substantially centrally arranged material cut-out. The material layer structure preferably has a cylindrical material cut-out along the axis of rotation for linking to a shaft.

The material layer is preferably in one piece.

The invention offers the advantage that the machine, in particular reluctance machine, in particular the rotor, is stable and resistant. Moreover, an increase in a maximum rotational speed is achieved on account of an increased stability.

The invention also offers the advantage of the material layers having a higher stability than conventional metal sheets with a flux barrier cut. Magnetic leakage is lower, parasitic oscillation is lower and noise development is therefore also lower.

In an advantageous embodiment of the invention, the material layer has an insulation material on at least one layer side.

The insulation material is preferably used for electrical insulation.

The insulation material is used in particular to electrically insulate a material layer with respect to at least one further material layer, if at least two or more material layers, in particular as a material layer structure, are arranged one above the other.

In a further advantageous embodiment of the invention, the material layer has an insulation material on both layer sides.

The material layer is thinner if it has insulation material only on one layer side. This embodiment is more favorable.

The material layer is better insulated, however, if it has insulation material on both layer sides.

In a further advantageous embodiment of the invention, the material layer has varnish, in particular thermosetting varnish.

The varnish, in particular thermosetting varnish, can be the insulation material. However, varnish and insulation material can also be two different materials.

The varnish, thermosetting varnish, is preferably applied and enables a particularly good electric insulation of the material layer, in particular with respect to an adjacent further material layer in a material layer structure.

In a further advantageous embodiment of the invention, the material layer can be strengthened with at least one further material layer (in other words: can be permanently connected).

The material layer is strengthened, in particular by means of the thermosetting varnish, with the further, in particular adjacent, material layer.

Two or more material layers can be strengthened in this way.

The advantageously applied thermosetting varnish enables a high stability of the material layer structure, produced in particular by means of strengthening, since the material layers are connected in a planar manner. This also reduces vibrations and noises.

In a further advantageous embodiment of the invention, the material layer has at least one third region, wherein the third region has permanent magnetic material, wherein the permanent magnetic material is connected with a material bond to the first material and/or to the second material.

Rare earth magnets, for instance neodymium iron boron and/or samarium cobalt, are preferably used as permanent magnetic material. Steel, aluminum nickel cobalt, bismanol and/or ferrite can also be used as permanent magnetic material, however. Moreover, the use of plastic magnetic material as permanent magnetic material is also possible.

In an advantageous embodiment of the invention, the permanent magnetic material has a radial magnetization.

In a further advantageous embodiment of the invention, the magnetic flux-conductive regions are used to form poles with a number of poles 2p, wherein the magnetic flux-conductive regions are arranged so that they adjoin the flux-blocking regions on a lower side facing the layer center point, wherein a pole pitch extends in the rotational direction from the center of the flux-blocking region to the center of the next flux blocking region.

In a further advantageous embodiment of the invention, a width of the flux blocking regions, viewed in the rotational direction, on an outer periphery of the material layer, corresponds to between 1% and 50% of the pole pitch, wherein a radial depth of a pole corresponds to >10% of a circular arc length of the pole pitch.

In a further advantageous embodiment of the invention, the magnetic flux-conductive regions are used to form poles with a number of poles 2p, wherein a magnetic flux-conductive region of flux blocking regions is drawn through substantially in the manner of an arc, wherein a pole pitch in the rotational direction extends from the center of the magnetic flux-conductive region to the center of the next magnetic flux-conductive region.

In a further advantageous embodiment of the invention, a width of the magnetic flux-conductive regions, viewed in the rotational direction, on an external periphery of the material layer, corresponds to between 1% and 50% of the pole pitch.

This embodiment is particularly well suited as a material layer for a material layer structure of a rotor, which is part of an inverse reluctance machine.

The object is further achieved by claim 11, i.e. by a method for producing a material layer, in particular as claimed in one of claims 1 to 10, wherein the material layer comprises at least one first material region, having a first material, and at least one second material region, having a second material, wherein the material regions are connected with a material bond, wherein the material layer is produced by means of an additive method.

Different additive methods are possible, for instance an MPA method and/or a cold spray method.

With the MPA method, a main gas, preferably water vapor, is accelerated in a Laval nozzle. Powder particles are injected shortly before the Laval point. The powder particles are accelerated to ultrasound speed and thus strike the substrate or a component. The high magnetic energy of the powder particle is converted into heat upon impact, as a result of which the particle adheres. Since the powder particles are not melted, only a minimal energy input into the component takes place. With MPA methods, a number of nozzles can apply different powder particles simultaneously. A component can therefore also be created which has at least two different materials.

With a cod spray method, powder particles, in particular with a diameter of 1 to 50 µm, are accelerated in an ultrasound gas jet to speeds of preferably up to 500-1000 m/s. Upon impact with a surface, the particles are plastically deformed and adhere to the surface.

Other additive methods are also conceivable.

In a preferred embodiment of the invention, a stencil-printing method is used, however. A stencil-printing method, which is described below, is used in particular.

In an advantageous embodiment of the invention, a method for producing a material layer, wherein the material layer comprises at least one first material region, having a first material, and at least one second material region, having a second material, has the following steps:
  applying a first suspension, having at least one binding agent and solid particles, through a first template onto a base area for achieving a first green body, wherein the first material region is reproduced by the first template,
  applying a second suspension, having at least one binding agent and solid particles, through a second template onto a base area for achieving a second green body, wherein the second material region is reproduced by the second template,
  joining the first green body and the second green body,
  creating a permanent, material-bonded cohesion between the two green bodies and the solid particles by heating and/or by means of compaction, in particular by means of sintering.

The binding agent is preferably driven out of the first green body and/or the second green body, in particular by means of debindering, before joining and/or after joining.

The first or second template is preferably a pattern for transferring desired shapes and/or peripheries and/or samples and/or cut-outs etc. The first or second template can be used as often as necessary.

The desired shape of the material layer can be formed precisely by means of the first or second template. There is therefore no waste. Three or more templates can also be used for one material layer.

The material layer is preferably in one piece by means of heating and/or compaction, in particular by means of sintering, of the two green bodies.

In a further advantageous embodiment of the invention, the solid particles comprise metal particles.

In a further advantageous embodiment of the invention, the solid particles of the first suspension comprise magnetic particles and the solid particles of the second suspension comprise amagnetic particles.

The magnetic particles preferably have the first magnetic permeability of $\mu r>50$. The amagnetic particles preferably have the second magnetic permeability of $\mu r<5$.

$\mu r>500$ preferably applies to the first magnetic permeability. Materials with the first magnetic permeability can be construction steel, electric sheet, or an iron cobalt alloy. Materials with a magnetic conductivity of $\mu r>2000$, in particular $3000<\mu r<4000$ are particularly suitable. Other materials are also conceivable.

Materials with the second magnetic permeability can be stainless steel, aluminum, copper, rubber, or plastic.

The materials with the second magnetic permeability are advantageously also not electrically conductive, like plastic, for instance.

In a further advantageous embodiment of the invention, the material with the second magnetic permeability comprises ceramic.

The ceramic is preferably an amagnetic oxide ceramic, for instance zirconium oxide or aluminum oxide.

The material with the second magnetic permeability can comprise exclusively ceramic or a mixture of ceramic and another material (e.g. stainless steel, aluminum, copper, rubber and/or plastic).

In a further advantageous embodiment of the invention, an insulation material is applied to the material layer on at least one layer side.

An insulation material is preferably applied to the material layer on both layer sides.

Different varnishes and/or coatings are suitable as insulation material.

The applied insulation material is preferably used for electrical insulation.

The applied insulation material is preferably used to electrically insulate a material layer with respect to at least one further material layer, if at least two or more material layers are arranged one above the other, in particular for creating a material layer structure.

If the insulation material is applied to the material layer on just one layer side, the material layer is thinner. If the insulation material is applied to the material layer on both layer sides, the material layer is better insulated.

In a further advantageous embodiment of the invention, a varnish, in particular thermosetting varnish, is applied to the material layer.

The varnish, in particular thermosetting varnish, can be the insulation material. However, varnish and insulation material can also be two different materials.

The advantageously applied thermosetting varnish enables a particularly good electrical insulation of the material layer, in particular with respect to an adjacent further material layer in a material layer structure.

Furthermore, the material layer can be strengthened with the adjacent material layer or the adjacent material layers in particular by means of the thermosetting varnish.

The advantageously applied thermosetting varnish enables a high stability of the material layer structure, since the material layers are connected in a planar manner. This also reduces vibrations and noises.

In a further advantageous embodiment of the invention, the suspension is pseudoplastic.

This is advantageous in that the suspension is less viscous during the application onto the base area to generate the green body, preferably with the scraper, and the desired shape can be transferred optimally through the template. Once the application process is ended, the green body retains the desired shape.

The method for producing a material layer structure for a rotor of a dynamoelectric rotary machine, in particular reluctance machine, has the following steps:
joining a plurality of material layers,
thermosetting the material layers for reciprocal strengthening.

The material layer structure for a rotor of a dynamoelectric rotary machine advantageously has a plurality of material layers arranged one above the other.

The plurality of material layers is preferably arranged in the direction of the axis of rotation.

The material layer structure preferably has a cylindrical material cut-out along the axis of rotation for linking to a shaft.

In a further advantageous embodiment of the invention, the rotor is embodied as a rotor module. At least two joined rotor modules produce the rotor.

A rotary dynamoelectric machine, in particular reluctance machine, with a rotor of this type can be used particularly effectively in process engineering with pumps, fans, compressors, mixers and centrifuges, in materials handling technology and also in mechanical engineering. The machine can generally be used universally with a rotor of this type.

Reluctance machines of this type can be used particularly effectively as synchronous reluctance motors. They are particularly suited to drives in street-bound and rail-bound vehicles, such as electric cars and trams, on account of their simple and robust design.

They can also be used particularly effectively for drives in airplanes and helicopters.

BRIEF DESCRIPTION OF THE DRAWING

The invention is described and explained in more detail below on the basis of the exemplary embodiments shown in the figures. In the drawings:

FIG. 7 shows a method for producing a material layer, FIG. 8 shows a method for producing a material layer structure, and FIG. 9 shows a dynamoelectric rotary machine.

DETAILED DESCRIPTION OF PREFERRED EMBODIMENTS

Figure 1:
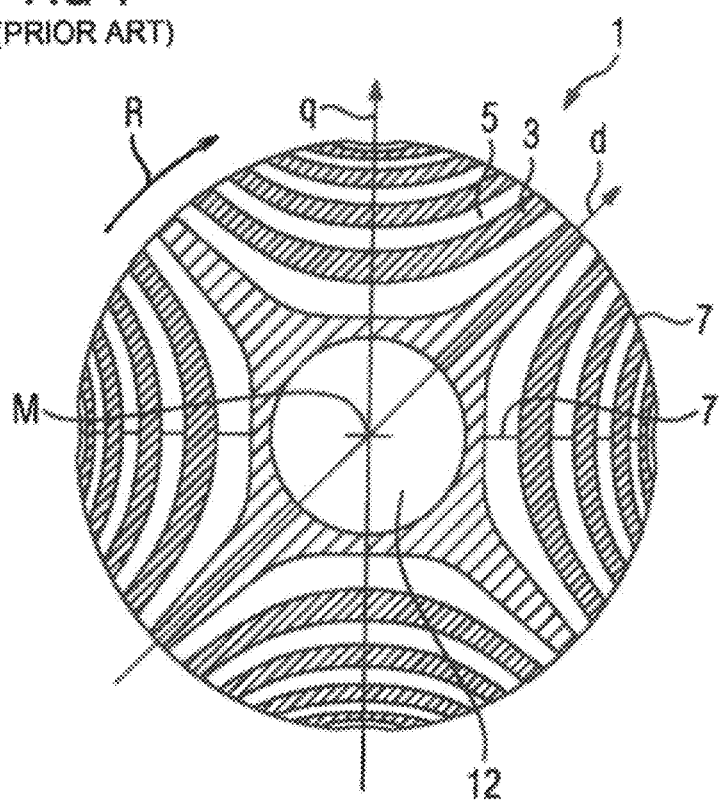
FIG. 1 shows the prior art.

FIG. 1 shows the prior art, in other words a metal sheet for a laminated core made from soft-magnetic material 3, which moreover has flux bafflers 5. The flux barriers 5 were stamped from the metal sheet and are filled with air or another gas. The figure moreover shows webs 7, which hold the metal sheet together and stabilize the metal sheet. Furthermore, the figure shows a rotational direction R, a center point M, an axis q and an axis d as well as a material cut-out 12.

The described reference characters are also applicable to the following figures, provided they are included in the exemplary embodiments, and are not explained again for reasons of clarity.

Figure 2:
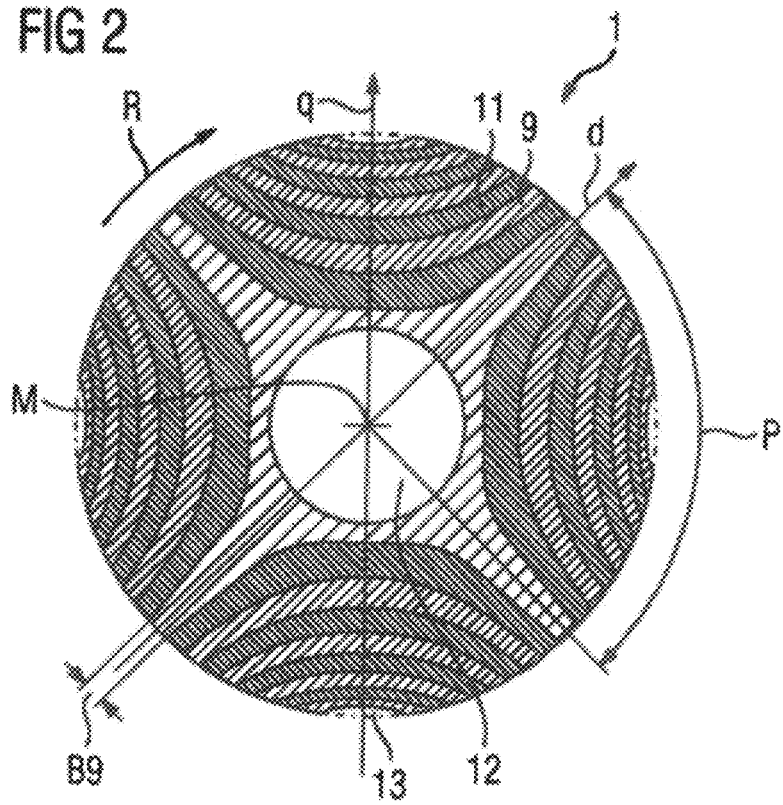
FIG. 2 shows a material layer for a machine, in particular reluctance machine.

FIG. 2 shows a material layer 1 for a machine, in particular reluctance machine. The material layer comprises magnetic flux-conductive regions 9 and magnetic flux-blocking regions 11. The magnetic flux-conductive regions 9 have magnetic, in particular soft-magnetic, material.

This magnetic material is preferably a material containing iron with a lower coercivity field strength, in particular <50 Nm, with a high saturation, in particular >2 T, and a high permeability, in particular μr>500.

The magnetic flux blocking regions 11 have amagnetic material. This material is preferably amagnetic, in particular with a permeability <1.5.

The amagnetic material is preferably steel, in particular stainless steel.

Steel with the material number 1.4404 is particularly suitable.

In the figure the regions 9 and 11 are connected to one another with a material bond and are therefore robust and resistant to high rotational speeds. No webs are required.

The regions 9 and 11 are preferably connected with a material bond by heating and/or by means of compaction, in particular by means of sintering, and form a one-piece component. This is explained in more detail below in the description of the method for production.

The figure moreover shows segment sections 13, which are air-filled, for instance. In order to avoid a pump effect, which develops with geometrically non-circular rotors, or to avoid noises, the segment sections 13 are alternatively filled with amagnetic material and preferably likewise connected with a material bond to the adjoining regions. The segment sections 13 are filled with amagnetic material even with high rotational speed requirements.

The segment sections 13, which are filled with amagnetic material, are also preferably connected with a material bond to the regions 9 and/or 11 by heating and/or by means of compaction, in particular by means of sintering, and form a one-piece component.

In one possible embodiment the amagnetic material is ceramic or a ceramic mixture.

Figure 3:
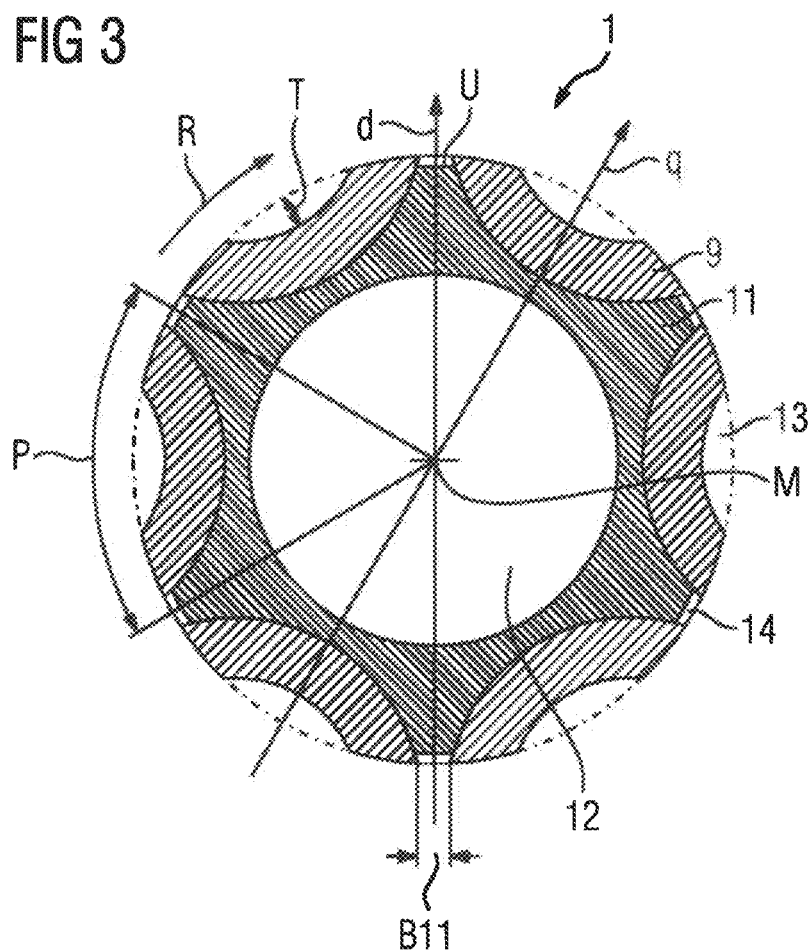
FIG. 3 shows a material layer for an inverse machine, in particular reluctance machine.

FIG. 3 shows a material layer 1 for an inverse reluctance machine.

The material layer 1 has, viewed in the rotational direction R, in each case a magnetic flux-blocking region 11 around the centers of the d-axes. Material/layer 1 has in each case a magnetic flux-conductive region 9 around the centers of the q-axes.

A pole P is formed by magnetic, in particular soft-magnetic material and is surrounded at least partially by amagnetic material. A pole is therefore, at least partially, surrounded by amagnetic material.

The figure moreover shows a width B11 of the flux-blocking region 11, viewed in the rotational direction R, and a depth U of the flux-blocking region 11, viewed in the rotational direction R. Eddy current losses can be kept minimal by means of the depth U.

Furthermore, the figure shows a radial depth T of the pole P.

The material layer 1 for an inverse reluctance machine is optimized with respect to a magnetic flux course by the embodiment of the regions 9 and 11. The optimization is successful in particular by only regions which are to conduct magnetic flux being provided with magnetic, in particular soft-magnetic material.

Figure 4:
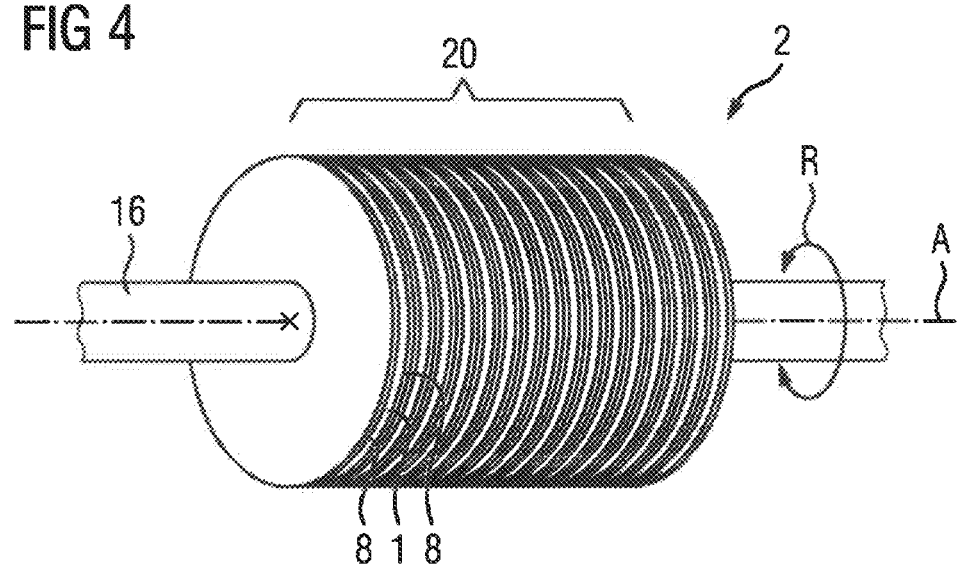
FIG. 4 shows a rotor, having a material layer structure with material layers insulated on both sides.

FIG. 4 shows a rotor 2, having a material layer structure 20 with material layers 1 which are insulated on both sides. The figure shows that the material layer structure 20 is linked to a shaft 16. Advantageously the shaft is designed to be amagnetic.

The rotor 2 rotates in the rotational direction R about an axis of rotation A. The axis of rotation A runs through the center point M in the previous figures.

Each material layer 1 preferably has an insulation material 8 on at least one layer side. The figure shows an embodiment, according to which each material layer 1 has an insulation material 8 on both layer sides.

In the figure the insulation material 8 is varnish, in particular thermosetting varnish.

It is also possible for the material layer 1 to have a different type of insulation material and, in addition, varnish. It is also possible for the material layer 1 to have a different type of insulation material on one layer side and varnish on the other layer side. It is also possible for the material layer 1 to have a hybrid form comprising a different type of insulation material and varnish.

In the figure the material layer 1 is strengthened with at least one further material layer. The figure shows a plurality of material layers strengthened with one another. This produces the material layer structure 20.

The strengthening is particularly successful as a result of applied thermosetting varnish, since this can be applied easily. An especially subsequent thermosetting of the material layers 1 creates a stable and robust connection.

Figure 5:
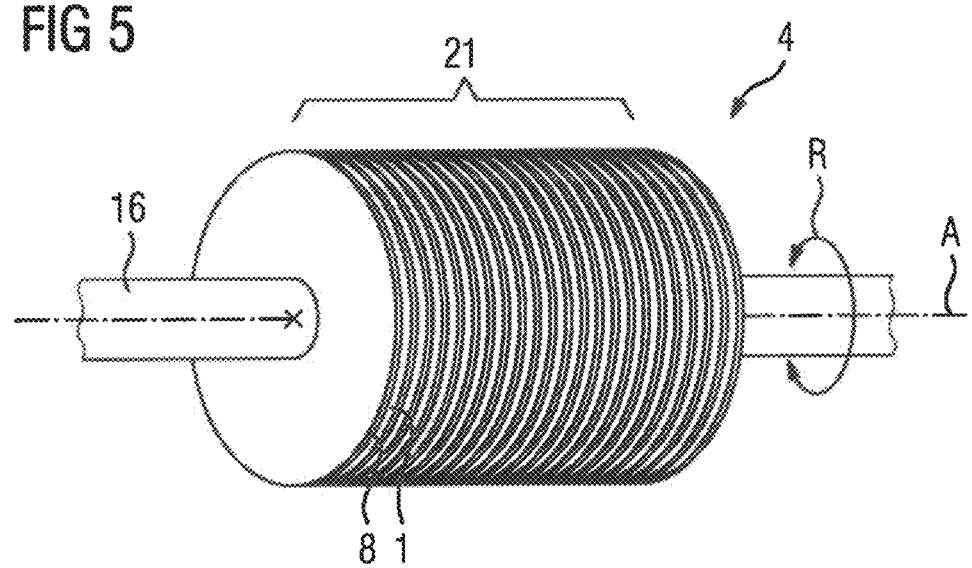
FIG. 5 shows a rotor, having a material layer structure with material layers insulated on one side.

FIG. 5 shows a rotor 4, having a material layer structure 21 with insulated material layers on one side. The figure shows an embodiment, according to which each material layer 1 has one insulation material 8 on just one layer side.

Figure 6:
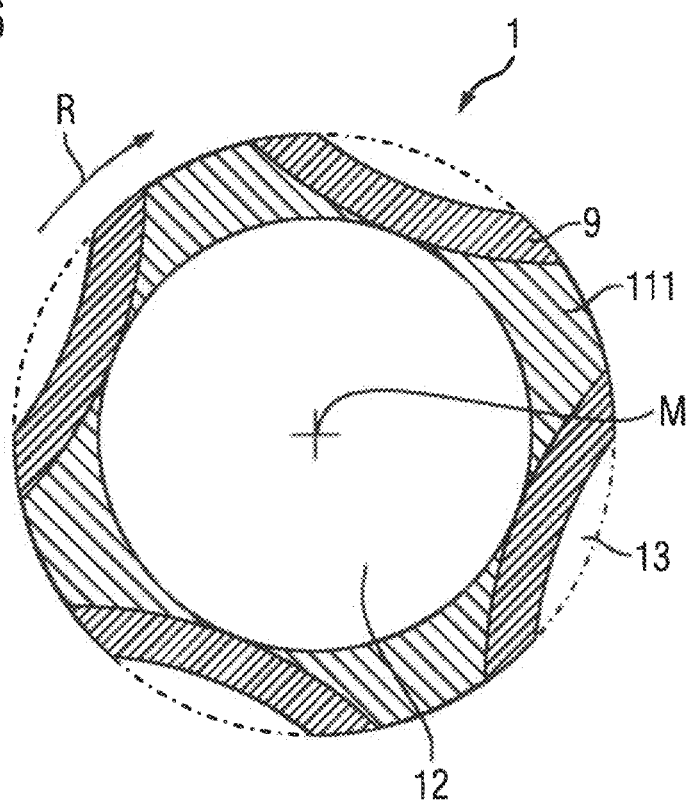
FIG. 6 shows a further material layer, having permanent magnetic material for an inverse reluctance machine.

FIG. 6 shows a further material layer 1, having permanent magnetic material for an inverse reluctance machine.

In the figure the material layer has a region 111 provided with permanent magnetic material. The region 111 can consist fully of permanent magnetic material or have a hybrid form made from amagnetic and permanent magnetic material.

This is advantageous in that two parallel magnetic circuits can be generated and these can be separated electromagnetically from one another. A first magnetic circuit uses the reluctance force. A second magnetic circuit uses the Lorentz force by means of the permanent magnetic material. In this way the magnetic circuits can complement one another and can overall deliver a larger torque with the same current.

The regions 9 and 111 are preferably connected with a material bond by heating and/or by means of compaction, in particular by means of sintering, and form a one-piece component.

The segment sections 13, which are filled with amagnetic material, are also preferably connected with a material bond to the regions 9 and/or 111 by heating and/or by means of compaction, in particular by means of sintering, and form a one-piece component.

The regions 9, 11 and/or 111 need not be connected with screws. Furthermore, no bonded joints or bindings are required.

FIG. 7 shows a method for producing a material layer.

In accordance with the invention the material layer has at least one first material region, having a first material, and at least one second material region, having a second material.

In a method step S1, a suspension, having at least one binding agent and solid particles, is therefore applied through a first template onto a base area in order to achieve a first green body. The first material region is reproduced by the first template (e.g. the already described region 11 or 111).

Here "applied" preferably means that the suspension is applied to the base area with a scraper.

In a method step S2, a second suspension, having at least one binding agent and solid particles, is applied through a second template onto a base area in order to achieve a second green body. The second material region is reproduced by the second template.

Various procedures can now be pursued. The respective binding agent from the first green body and/or the second green body can be driven out before the joining process in a method step S3 (see method step S21) of the first green body and the second green body and/or after the joining process (see method step S31).

The driving-out of the binding agent is preferably effected by means of debindering.

In a method step S4, a permanent, material-bonded joining of the two green bodies to one another and the solid particles in the respective green body is created by heating and/or by means of compaction, in particular by means of sintering.

In a method step S5, an insulation material is applied to the material layer on at least one layer side. The insulation material is preferably a varnish, in particular thermosetting varnish.

Applied here means preferably that insulation material is applied to the layer side with a scraper or the layer side is coated with a coating tool or the layer side is immersed into a vessel containing the insulation material.

FIG. 8 a method for producing a material layer structure.

In method step S11, a plurality of material layers (at least two) is joined. The production of the material layers was described in FIG. 7.

The material layers advantageously having thermosetting varnish are arranged one above the other in order to form the material layer structure.

In method step S12, the material layers are thermoset with one another for reciprocal strengthening.

Here thermosetting means that the material layers are preferably glued to one another by means of pressure and heat. The thermosetting varnish becomes soft as a result of the pressure and heat and the material layers adhere to one another and harden. This is advantageous compared with other connection options such as welding, stamping and riveting in that the material layers have no contact points which cause damage to the material. Moreover, a magnetic flux is not disturbed and no material stresses and material deformations appear.

FIG. 9 shows the dynamoelectric rotary machine, in particular reluctance machine 6. The machine, in particular reluctance machine 6, has a stator 15 and a rotor 2, 4.

The invention claimed is:

1. A method for producing a material layer composed of a first green body and a second green body for a dynamoelectric rotary machine by an additive process, said method comprising:
producing the first green body by applying a first suspension having a first binding agent and first solid particles through a first template onto a base area, thereby creating a first material region with a first magnetic permeability $\mu_r$>50 to form a magnetic flux-conductive region;
producing the second green body by applying a second suspension having a second binding agent and second solid particles through a second template onto the base area, thereby creating a second material region with a second magnetic permeability $\mu_r$<5 which is lower than the first magnetic permeability;
debindering the first and second green bodies;
joining the first and second debindered green bodies to one another; and
creating a permanent, material-bonded cohesion between the first and second debindered green bodies and the first and second solid particles by thermosetting or sintering.

2. The method of claim 1, wherein the solid particles comprise metal particles.

3. The method of claim 1, wherein the solid particles of the first suspension comprise magnetic particles, wherein the solid particles of the second suspension comprise amagnetic particles.

4. The method of claim 1, further comprising applying an insulation material to the material layer on at least one layer side.

5. A material layer for a dynamoelectric rotary machine, said material layer comprising:
a first magnetic flux-conductive material region constructed as a first green body from a first material with a first magnetic permeability $\mu_r$>50;
a second flux-blocking material region constructed as a second green body from a second material with a second magnetic permeability $\mu_r$<5 which is lower than the first magnetic permeability;
wherein the material layer is produced by debindering the first and second green bodies, and joining the first and second debindered green bodies to one another by a permanent, material-bonded cohesion generated by thermosetting or sintering between the first and second green bodies.

6. The material layer of claim 5, configured for use in a rotor of the dynamoelectric rotary machine, said material layer having a layer center point coinciding with an axis of rotation of the rotor.

7. The material layer of claim 5, further comprising varnish applied on at least one layer side of the material layer.

8. The material layer of claim 7, wherein the varnish is a thermosetting varnish.

9. The material layer of claim 5, further comprising a further material layer applied to the material layer for strengthening the material layer.

10. The material layer of claim 5, further comprising a third region having permanent magnetic material, said permanent magnetic material being connected with a material bond to the first material or to the second material.

11. The material layer of claim 6, wherein the magnetic flux-conductive material region forms a plurality of magnetic poles, wherein each pole is located between two flux-blocking regions in a circumferential direction.

12. The material layer of claim 11, wherein a width of the flux-blocking region, viewed in the rotational direction, at an external periphery of the material layer, corresponds to between 1% and 50% of a pole pitch, wherein a radial depth of a pole corresponds to >10% of a circular arc length of the pole pitch.

13. The material layer of claim 11, wherein the magnetic flux-conductive region is forms a plurality of magnetic poles, wherein as viewed in a plane of the material layer structure, magnetic flux-conductive regions alternate with flux-blocking regions in a radial direction of the material layer structure from a center to a magnetic pole and have a shape of an arc.

14. The material layer of claim 13, wherein a width of the magnetic flux-conductive region, viewed in the rotational direction, at an external periphery of the material layer, corresponds to between 1% and 50% of a pole pitch.

\* \* \* \* \*